United States Patent [19]

Tassic

[11] Patent Number: 5,287,756
[45] Date of Patent: * Feb. 22, 1994

[54] TRANSDUCER FOR SENSING TENSION LOADING OF A CONVEYOR CHAIN

[76] Inventor: William P. Tassic, 42036 Queen Anne Ct., Northville, Mich. 48167

[*] Notice: The portion of the term of this patent subsequent to May 4, 2000 has been disclaimed.

[21] Appl. No.: 49,170

[22] Filed: Apr. 19, 1993

Related U.S. Application Data

[63] Continuation of Ser. No. 711,931, Jun. 7, 1991, Pat. No. 5,207,108.

[51] Int. Cl.$^5$ ............................................. G01L 5/04
[52] U.S. Cl. ......................... 73/862.391; 73/862.471
[58] Field of Search .............. 73/862.391, 862.627, 73/862.68, 773, 862.474, 862.471

Primary Examiner—Richard E. Chilcot, Jr.
Assistant Examiner—Elizabeth L. Dougherty
Attorney, Agent, or Firm—Brooks & Kushman

[57] ABSTRACT

A transducer (30) for sensing tension loading of a conveyor chain (12) of the type including single and dual links (14,16) pivotally connected in an alternating relationship includes a transducer link (40) having opposite ends (42,44) for connection along the chain and also includes a transducer member (46) mounted by the transducer link (40) between its ends. The transducer member (46) includes an opening (48) and at least one strain gauge (50) mounted thereon. A clamp (52) of the transducer compresses the transducer member (46) as tension loading is applied between the opposite ends of the transducer link to provide a strain gauge indication of the extent of the tension loading. The clamp (52) includes a clamp member (54) that opposes a clamping seat (56) on the transducer link (40) with the transducer member (46) clamped therebetween by a connector (58) that extends to one end (42) of the transducer link. The connector (58) includes a connector end (62) that carries the chain tension, a shank (64) that extends through a hole (60) in the transducer member (46), and a clamping end (66) that is secured to the clamp member (54) preferably by a threaded connection.

13 Claims, 2 Drawing Sheets

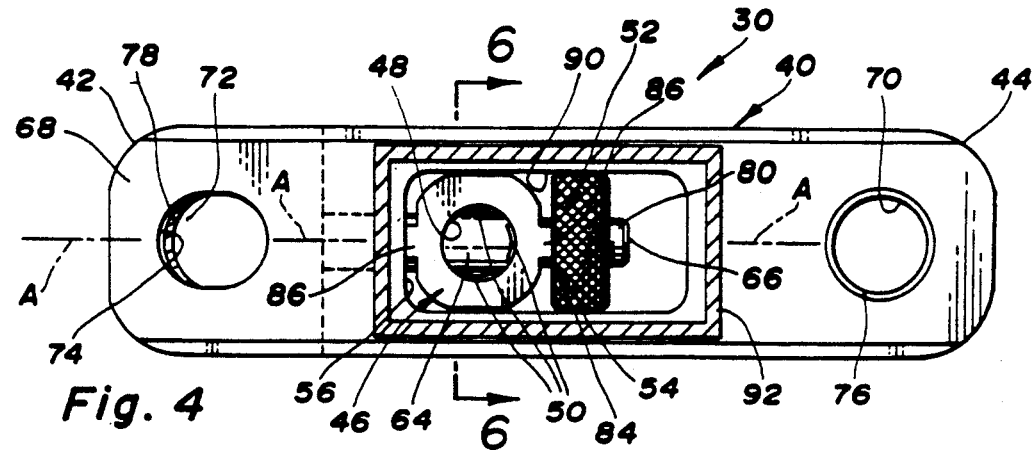
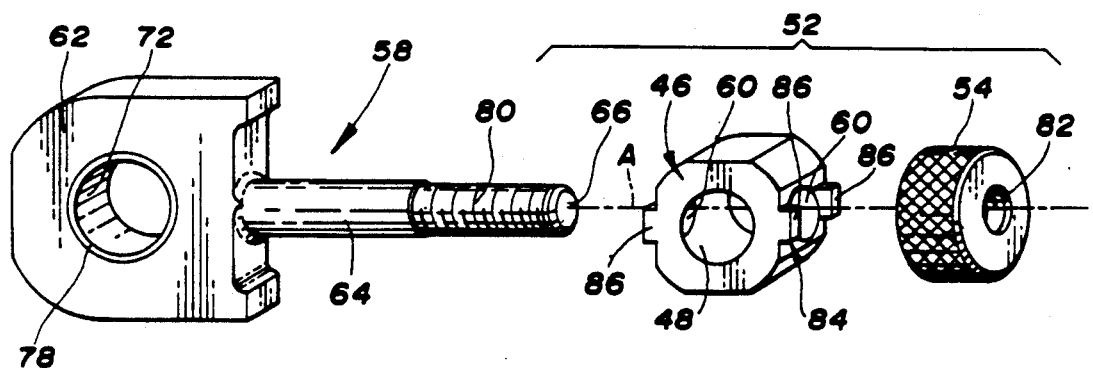
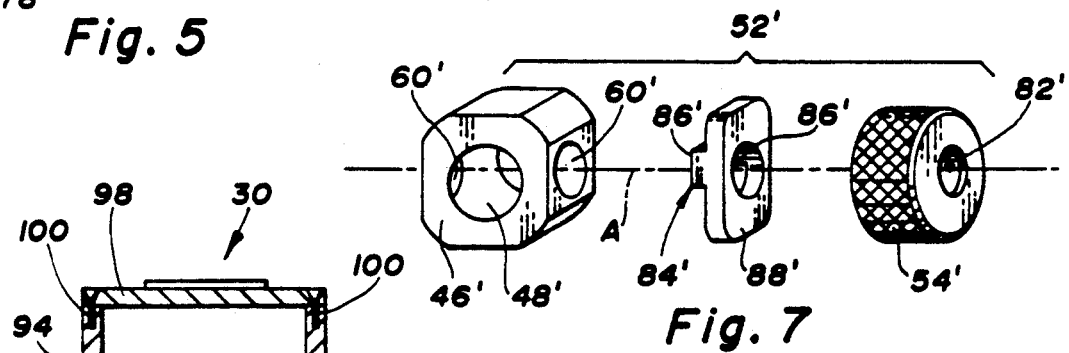
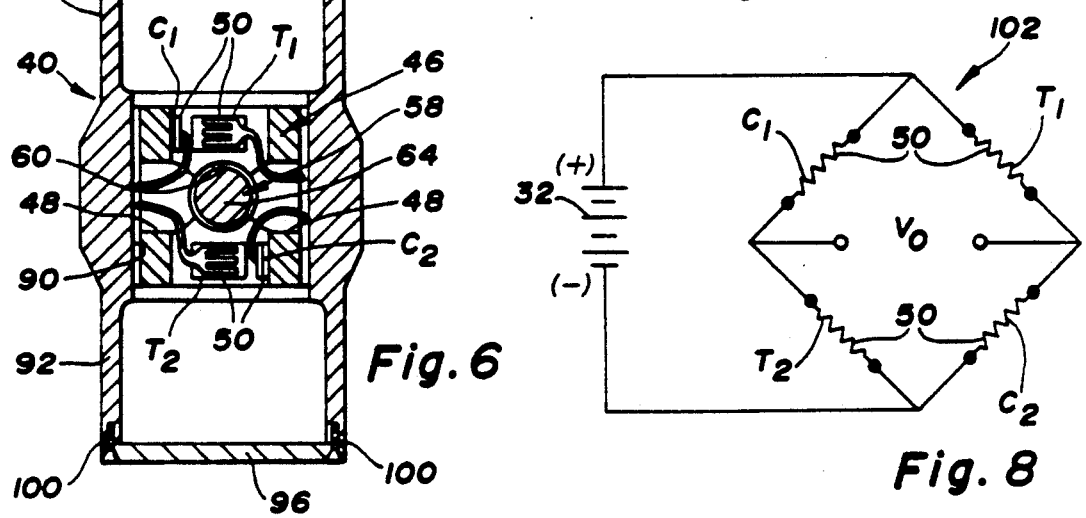

TRANSDUCER FOR SENSING TENSION LOADING OF A CONVEYOR CHAIN

This is a continuation of copending application Ser. No. 07/711,931 filed on Jun. 7, 1991, now U.S. Pat. No. 5,207,108.

TECHNICAL FIELD

This invention relates to a transducer for sensing tension loading of a conveyor chain of the type including single and dual links pivotally connected in an alternating relationship along an axis of the chain.

BACKGROUND ART

Conveyor chains for heavy duty conveyors conventionally include single and dual links pivotally connected in an alternating relationship along an axis of the chain. The single link is conventionally referred to as a "dog bone" link in that it has a smaller intermediate portion and opposite ends that are enlarged. At each enlarged end, adjacent ends of the adjacent pair of dual links are pivotally connected to the enlarged end of the dog bone single link by an associated connection pin that extends vertically. Three basic types of conveyors incorporate this type of conveyor chain. One of these types of conveyors is referred to as an overhead monorail and is suspended by trollies from a horizontally extending beam having flanges on which rollers of the trollies ride. Another of these types of conveyors is referred to as an overhead power and free and is basically the same as the overhead monorail except that another horizontal beam below the conveyor chain supports load trollies which are connected to and detached from the conveyor chain by clutch dogs at stations along which the conveyor chain conveys loads supported by the load trollies. A third type of these conveyors is referred to as an inverted power and free and is basically the same as the overhead power and free except for the fact that the conveyor chain is supported for movement above a horizontal beam on which trolley rollers are supported and load trollies are supported above the chain by another horizontal beam for movement upon connection thereof to the chain by clutch dogs as well as being released from the chain by the clutch dogs when necessary.

When conveyor chains of the type involved with the present invention are negotiating certain areas of the conveyor, wear of the conveyor components involved can excessively tension the chain and thereby eventually cause failure. For example, a conveyor chain negotiating a turn is moved over a roller which if not properly greased can produce friction and/or wear that may tension the chain beyond its normal operating tension. Any failure of the chain shuts down the conveyor and thereby causes an enormous financial loss. This is especially the case if the conveyor involved feeds components to other conveyor lines of the factory and thereby also shuts down the other conveyor lines.

In order to sense conveyor chain loading in order to permit proper maintenance of the conveyor, it has previously been proposed to utilize strain gauges with links of the conveyor chain. See, for example, U.S. Pat. No. 4,566,339 Davidson et al and U.S. Pat. No. 4,803,886 May et al, and United Kingdom Patent application 2,041,549 of inventor Cecil J. Austen. Each of these prior references discloses a conveyor chain wherein the single link has strain gauges applied thereto so as to sense the loading, and the load signal sensed may be sent by telemetry or otherwise for monitoring. Since the strain gauges utilized with these prior art references are applied directly to the link that carries the load, the load reading is not particularly sensitive.

Other prior art references which were noted during the investigation conducted for the present invention, but which are not believed to be analogous prior art because the transducers involved are not for use with a conveyor chain, are set forth below along with a description of the use for which the transducer is designed.

U.S. Pat. No. 2,590,626 Jones discloses a tension yoke for compression load weighing stations wherein a compression column on which strain gauges are mounted is compressed by a load transmitting member located in engagement with an inner flat link located between two outer flat links.

U.S. Pat. No. 3,100,290 Propper discloses a columnar stress sensing member which includes a strain gauge element located between a stress applying part and a stress resisting part with strain gauges mounted within a cylindrical surface of the strain element.

U.S. Pat. No. 3,246,510 Ruge discloses a non-linearity compensation means for electrical strain gauge transducer wherein one disclosed embodiment has a transducer element located between two connectors where a force is applied and having a central round opening in which strain gauges are mounted to sense the loading.

U.S. Pat. No. 3,559,474 Gurol et al discloses a force transducer load cell which includes an annular member having an outer surface on which strain sensitive elements are mounted to sense loading.

U.S. Pat. No. 4,079,624 Kurtz discloses a load washer transducer assembly which also has an annular shape and an outer surface on which sensor elements are mounted.

U.S. Pat. No. 4,282,762 Zenker discloses a load sensing transducer which includes an annular member on which strain gauges are mounted to sense loading.

U.S. Pat. No. 4,770,049 Jones et al discloses load measuring devices which have annular shapes having strain gauges mounted on outwardly facing surfaces.

U.S. Pat. No. 4,420,755 Primbs, Jr. discloses a telemetry load link assembly for measuring strain in a load cable between an aircraft and a recovered object.

DISCLOSURE OF INVENTION

An object of the present invention is to provide an improved transducer that has the capability of accurately sensing tension loading of a conveyor chain of the type including single and dual links pivotally connected in an alternating relationship along an axis of the chain.

In carrying out the above and other objects of the invention, the transducer includes a transducer link having opposite ends for connection along the chain between links thereof such that the transducer link extends along the axis of the chain. A transducer member of the transducer is mounted by the transducer link between its ends. The transducer member includes an opening that extends transversely to the chain axis and also includes at least one strain gauge mounted on the transducer member. A clamp of the transducer compresses the transducer member as tension loading is applied between the opposite ends of the transducer link to provide a strain gauge indication of the extent of the tension loading to which the conveyor chain is subjected.

In the preferred construction, the clamp includes a clamp member and the transducer link includes a clamping seat that opposes the clamp member. The clamp also includes a connector that extends between the clamp member and one end of the transducer link with the transducer member clamped therebetween to sense the tension loading of the chain.

In its preferred construction, the transducer member includes a hole extending therethrough in opposite directions from the opening thereof along the axis of the chain. The connector of the clamp in the preferred construction disclosed includes: (a) a connector end located adjacent the one end of the transducer link to which the connector extends, (b) a shank that extends from the connector end through the hole in the transducer member, and (c) a clamp end that is connected to the clamp member.

The transducer link of the transducer preferably has a unitary construction with the one end thereof at which the connector is located provided with a bifurcated shape including spaced legs between which the connector end of the connector is located. The other end of the transducer link includes a connection pin opening, and the connector end of the connector of the clamp also includes a connection pin opening. The spaced legs of the bifurcated end of the transducer link have connection pin openings that are aligned with the connection pin opening of the clamp connector and are elongated along the axis of the chain such that the legs do not carry tension loading of the chain unless the transducer member fails under the tension loading of the chain, whereupon the spaced legs of the bifurcated end of the transducer link carry the chain tension. The connection pin opening of the end of the transducer link opposite its bifurcated end includes a bushing, and the connection pin opening of the clamp connector also includes a bushing. These bushings can be conveniently replaced when worn and thereby extend the useful lifetime of the transducer.

In the preferred construction disclosed, the clamp includes a threaded connection that connects the clamp member and the connection end of the connector. This threaded connector allows the transducer member to be preloaded the required extent in preparation for use.

In its preferred construction, the transducer also includes a load concentrator for applying the compression loading of the transducer member by the clamp. In one preferred embodiment, the load concentrator is mounted on the transducer member. In another preferred embodiment, the load concentrator is a component of the clamp.

As disclosed, the transducer link is preferably made as an investment casting. This investment cast transducer link most preferably has a central cavity in which the transducer member is received and compressed by the clamp. Furthermore, the investment cast transducer link preferably has at least one housing portion projecting from the cavity and, as disclosed, has a pair of housing portions projecting in opposite directions from the cavity.

At least one strain gauge of the transducer member is mounted within its transversely extending opening. As disclosed, the transducer member includes two tension strain gauges and two compression strain gauges, and a Wheatstone bridge connects the tension and compression strain gauges of the transducer member.

The objects, features and advantages of the present invention are readily apparent from the following detailed description of the best modes for carrying out the invention when taken in connection with the accompanying drawings.

BRIEF DESCRIPTION OF DRAWINGS

FIG. 4 is a bottom plan view of the transducer taken partially in section along the direction of line 4—4 in FIG. 3 to illustrate a transducer member and clamp that cooperate to sense the conveyor chain loading;

FIG. 5 is a partial perspective view that further illustrates the construction of the clamp of the transducer;

FIG. 6 is a cross-sectional view taken through the transducer along the direction of line 6—6 in FIG. 4 and illustrates the location of strain gauges on the transducer member which is clamped by the clamp to sense the tension loading of the chain;

FIG. 7 is a perspective view of an alternate embodiment of the transducer member and clamp; and FIG. 8 is a view of an electrical circuit that includes a Wheatstone bridge utilized to connect the strain gauges of the transducer to sense the tension loading of the chain.

BEST MODES FOR CARRYING OUT THE INVENTION

Figure 1:
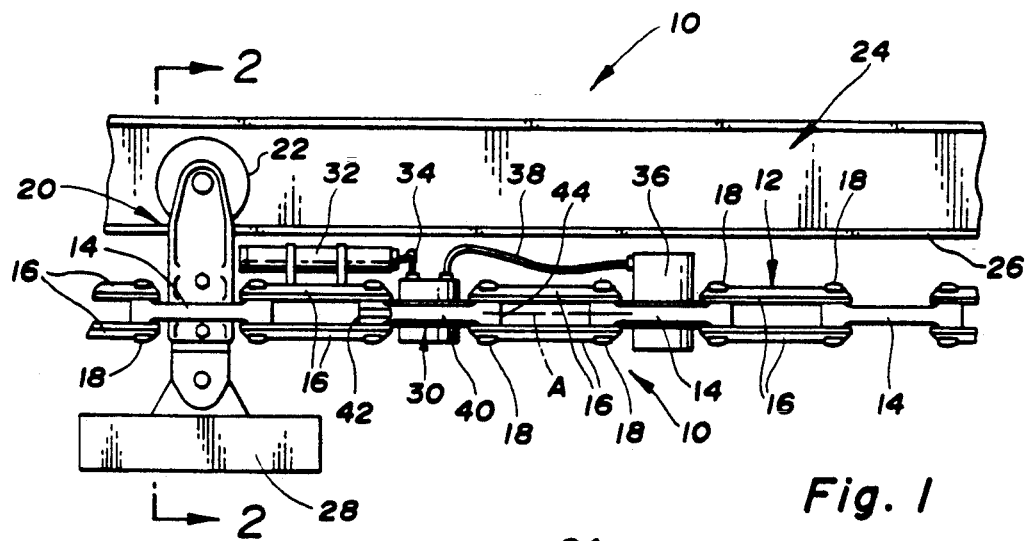
FIG. 1 is a side elevational view of a conveyor whose conveyor chain includes a transducer constructed in accordance with the present invention to sense tension loading of the chain.
Figure 2:
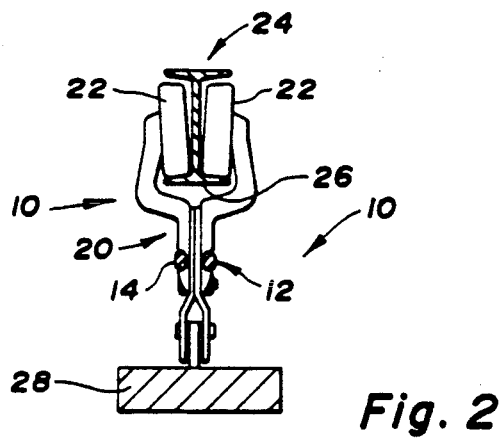
FIG. 2 is a cross-sectional view of the conveyor taken along the direction of line 2—2 in FIG. 1.

With reference to FIGS. 1 and 2 of the drawings, a conveyor generally indicated by 10 includes a conveyor chain 12 of the type including single links 14 and dual links 16 pivotally connected in an alternating relationship along an axis A of the chain. Each of the single links 14 is of the conventional "dog bone" construction including an intermediate portion that extends between enlarged ends where connection pins 18 extend vertically to provide the pivotal connection of the links to each other. More specifically, the dual links 16 are positioned below and above the single links 14 and with the connection pins 18 cooperatively provide the chain 12 with the capability of negotiating horizontal turns during conveyance in a closed loop. Trollies 20 (only one shown) of the chain each have an upper yoke shape for supporting a pair of rollers 22 as shown in FIG. 2 such that the rollers are supported by a horizontal beam 24 on a lower flange 26 of the beam for horizontal movement. An intermediate portion of each trolley 20 has a connection to the chain 12 which is at one of the single links 14 as shown, and each trolley 20 also has a lower end that supports a load 28 to be moved by the conveyor.

As illustrated in FIG. 1, a transducer 30 constructed in accordance with the present invention is disposed along the conveyor chain 12 to sense tension loading of the chain. This transducer 30 is of the strain gauge type as is hereinafter more fully described and is powered by a battery source 3 2 mounted on an adjacent link 16 and energized through a conduit 34. A data logger 36 is mounted on an adjacent link 14 and has a connection through a conduit 38 to the transducer 30 to provide recording of tension load data sensed by the transducer as is hereinafter more fully described.

It should be noted that while the transducer 30 is shown in FIG. 1 as being utilized with an overhead monorail type of conveyor 10, the transducer can also be utilized with an overhead power and free type conveyor wherein the chain is coupled to and uncoupled from load trollies supported on another horizontal beam below the conveyor chain, and the transducer is also usable with an inverted power and free conveyor wherein the conveyor chain is supported by trollies on a lower horizontally extending beam and is coupled to and uncoupled from load trollies supported above the conveyor chain by another horizontally extending beam.

Figure 3:
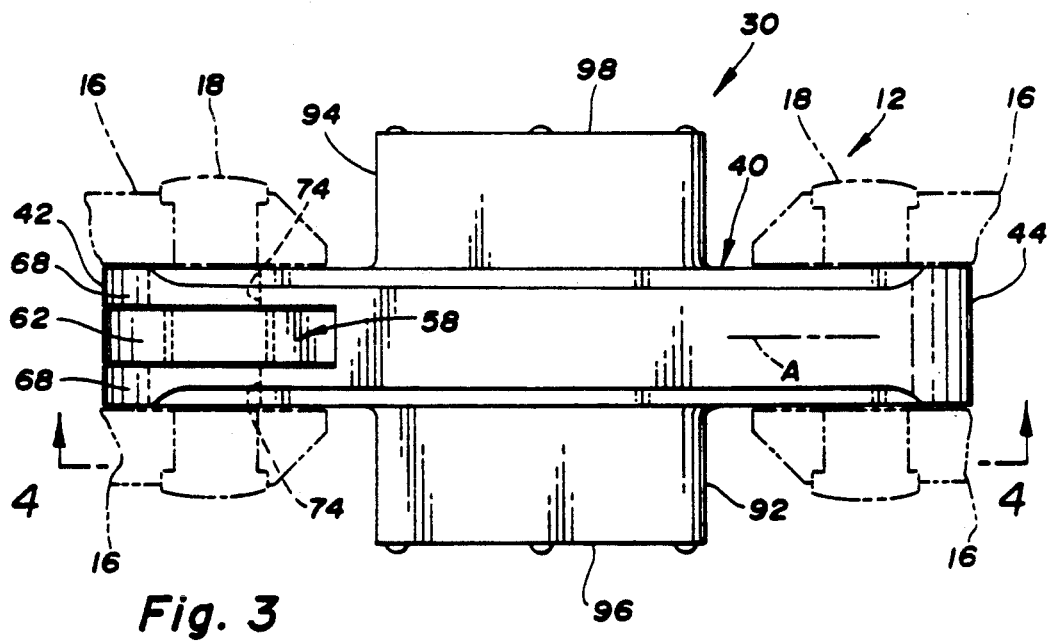
FIG. 3 is an enlarged view of the transducer taken in the same direction as FIG. 1.

With additional reference to FIGS. 3 and 4, the transducer 30 includes a transducer link 40 having opposite ends 42 and 44 for connection between the links of the chain such that the transducer link extends along the chain axis A as shown in FIG. 1. More specifically, the transducer link 40 is shown in FIG. 1 as replacing one of the "dog bone" shaped single links 14 with its opposite ends connected by the connection pins 18 to associated pairs of the dual link 16 as previously described. Between the opposite transducer link ends 42 and 44 as shown in FIG. 4, transducer 30 includes a transducer member 46 mounted by the transducer link. This transducer member 46 includes an opening 48 that extends transversely to the chain axis A and also includes at least one strain gauge 50 of the electrical resistance type mounted thereon as is hereinafter more fully described. A clamp 52 of the transducer compresses the transducer member 46 as tension loading is applied between the opposite ends 42 and 44 of the transducer link 40 to provide a strain gauge indication of the extent of the tension loading to which the conveyor chain is subjected.

As shown in both FIGS. 4 and 5, the clamp 52 of the transducer includes a clamp member 54 that clamps against the transducer member 46. A clamping seat 56 of the transducer link 40 opposes the clamp member 54 with the transducer member 46 located therebetween. Clamp 52 also includes a connector 58 that extends between the clamp member 54 and the one end 42 of the transducer link 40 with the transducer member 46 clamped therebetween to sense the tension loading of the chain.

As best shown in FIG. 5, the transducer member 46 includes a hole 60 extending therethrough in opposite directions from the opening 48 thereof along the axis A of the chain. Connector 58 of clamp 52 includes a connector end 62 that is located adjacent the one end 42 of the transducer link 40 in the assembled condition shown in FIG. 3 and also includes a shank 64 that extends from the connector end 62 as shown in FIG. 5 through the hole 60 in transducer member 46 so as to extend across the transducer member opening 48 as shown in FIG. 4. A clamp end 66 of the connector 58 is supported by the shank 64 and is connected to the clamp member 54 so as to thereby provide the clamping of the transducer member 46 between the clamp member and the clamping seat 56 of the transducer link 40 as illustrated in FIG. 4.

As illustrated by combined reference to FIGS. 3 and 4, the transducer link 40 has a unitary construction with its one end 42 having a bifurcated shape including spaced legs 68 between which the connector end 62 of connector 58 is located as best shown in FIG. 3. The other end 44 of the transducer link 40 includes a connection pin opening 70 as illustrated in FIG. 4, and the connector end 62 of the connector 58 has a connection pin opening 72 as shown in FIG. 5. The spaced legs 66 of the bifurcated and 42 of transducer link 40 have connection pin openings 74 that are aligned with the connection pin opening 72 in the clamp connector 58 at its connector end 62 and are elongated along the axis A of the chain such that the legs 68 do not carry any tension loading of the chain unless the transducer member 46 fails under the tension loading of the chain applied by clamp 52. Upon such failure, the connector 58 moves toward the transducer link end 42 such that the leg openings 74 are engaged by the associated connection pin 18 to then carry the chain tension. As such, the conveyor chain 12 will continue to operate without any disruption of its conveying function. The transducer link end 44 is preferably located at the downstream end of the conveyor chain so as to be engaged by the conveyor drive sprockets that drive the chain. The bifurcated transducer link end 42 is thus free from the forces applied by the conveyor drive sprockets.

With reference to FIG. 4, the connection pin opening 70 of the transducer link end 44 has a bushing 76. Furthermore, the connection pin opening 72 of the connector end 62 of connector 58 has a bushing 78. These bushings 76 and 78 can be replaced when worn and thereby lengthen the useful lifetime of the transducer 30. As illustrated in FIG. 5, the clamp end 66 of connector 58 includes external male threads 80, and the clamp member 54 has a central hole with internal female threads 82. These male and female threads 80 and 82 cooperatively provide a threaded connection that secures the clamp member 54 to the connector 58 and thereby provides clamping of the transducer member 46 as shown in FIG. 4. Threading rotation of the clamp member 54 thus provides a slight preload clamping of the transducer member 46.

Transducer 30 as illustrated in FIG. 4 and in FIG. 5 includes a load concentrator 84 for applying the compression loading of the transducer member 46 by the clamp 52. This load concentrator 84 is embodied by lugs 86 mounted on the transducer member 46 at each side of hole 60 at each of the hole ends. These lugs 86 engage the clamp member 54 and clamping seat 56 of the transducer link 40 as illustrated in FIG. 4 to concentrate the tension loading of the chain applied to transducer member 46. In an alternate embodiment illustrated in FIG. 7, the load concentrator 84' is a component of the clamp 52' and is constructed as a load concentrator member 88' that is interposed between the transducer member 46' and the clamp member 54 which has the same construction as the embodiment of FIG. 5. It is also possible with this alternative construction to utilize another load concentrator member 88' facing in an opposite direction to engage the other side of the transducer member 46' in order to further concentrate the chain tension loading applied to the transducer member.

Transducer link 40 illustrated in FIGS. 3, 4 and 6 is preferably made as an investment casting of stainless steel although it can also be machined from stainless steel barstock. The construction of the investment cast transducer link 40 includes a central cavity 90 in which the transducer member 46 is received and compressed by the clamp 52. Furthermore, the investment cast transducer link 44 preferably includes at least one housing portion 92 projecting from the cavity 90 and most preferably includes a pair of housing portions 92 and 94 projecting in opposite directions from the cavity as best shown in FIG. 6. These housing portions 92 and 94 allow for suitable electrical circuitry associated with the transducer link to be mounted therein and enclosed by associated covers 96 and 98 that are secured by associated bolts 100.

As illustrated by combined reference to FIGS. 4 and 6, at least one of the strain gauges 50 is mounted within the transversely extending opening 48 of the transducer member 46. As illustrated, there are four strain gauges 50 including two tension gauges $T_1$ and $T_2$ and two compression gauges $C_1$ and $C_2$. All four of these tension and compression strain gauges are illustrated as being mounted within the opening 48 of the transducer member 46 with the two tension gauges $T_1$ and $T_2$ located at upper and lower positions at the same side of the opening (the downstream side) and with the two compression gauges $C_1$ and $C_2$ located at upper and lower positions on opposite lateral sides of the opening as best shown in FIG. 6. A Wheatstone bridge 102 connects the four strain gauges 50 and is energized by the battery source 32 to provide a voltage output $V_0$ that increases when the transducer member is clamped by the conveyor tension loading as described above.

The construction of the transducer 30 provides sensing of tension loading of the conveyor chain without being subjected to angular bending moments that are not indicative of chain tension. Furthermore, as mentioned above, the transducer link 40 is constructed so as to carry the conveyor chain load if the transducer member 46 fails. The sensitivity of this transducer member 46 is controlled by the size of the opening 48 so as to provide convenience in sensing different magnitudes of loading.

While the best modes for carrying out the invention have been described in detail, those familiar with the art to which this invention relates will recognize various alternative designs and embodiments for practicing the invention as defined by the following claims.

What is claimed is:

1. A transducer for sensing tension loading of a conveyor chain of the type including single and dual links pivotally connected in an alternating relationship along an axis thereof, the transducer comprising: a transducer link having opposite ends for connection along the chain between links thereof such that the transducer link extends along the axis of the chain; one of the ends of the transducer link having a bifurcated shape including a pair of spaced legs with aligned connection pin openings that have elongated shapes along the axis of the chain; the other end of the transducer link including a connection pin opening; a transducer member located between the ends of the transducer link and including at least one strain gauge; and a clamp including: (a) a connector end located between the spaced legs of the one end of the transducer link and having a connection pin opening aligned with the elongated connection pin openings of the spaced legs such that the legs normally do not carry any tension loading of the chain but can carry the chain tension upon failure of the transducer member, (b) a shank that extends from the connector end toward the other end of the transducer link, and (c) a clamp that is connected to the shank to compress the transducer member as tension loading is applied between the opposite ends of the transducer link.

2. A conveyor chain tension transducer as in claim 1 wherein the clamp includes a clamp member, the transducer link including a clamping seat that opposes the clamp member, and the clamp shank extending between the clamp member and the one end of the transducer link with the transducer member clamped therebetween to sense the tension loading of the chain.

3. A conveyor chain tension transducer as in claim 2 wherein the connection opening of the other end of the transducer link includes a bushing, and the connection opening of the clamp connector also including a bushing.

4. A conveyor chain tension transducer as in claim 2 wherein the clamp includes a threaded connection that connects the clamp member and the connection end of the connector.

5. A conveyor chain tension transducer as in claim 1 further including a load concentrator for applying the compression loading of the transducer member by the clamp.

6. A conveyor chain tension transducer as in claim 5 wherein the load concentrator is mounted on the transducer member.

7. A conveyor chain tension transducer as in claim 5 wherein the load concentrator is a component of the clamp.

8. A conveyor chain tension transducer as in claim 1 wherein the transducer link is an investment casting.

9. A conveyor chain tension transducer as in claim 1 wherein the transducer link is an investment casting and has a central cavity in which the transducer member is received and compressed by the clamp.

10. A conveyor chain tension transducer as in claim 9 wherein the transducer link has at least one housing portion projecting from the cavity.

11. A conveyor chain tension transducer as in claim 9 wherein the transducer link has a pair of housing portions projecting in opposite directions from the cavity.

12. A conveyor chain tension transducer as in claim 1 wherein the transducer member has an opening extending transversely to the claim axis, and at least one strain gauge of the transducer member being mounted within its transversely extending opening.

13. A conveyor chain tension transducer as in claim 1 wherein the transducer member includes two tension strain gauges and two compression strain gauges, and a Wheatstone bridge that connects the tension and compression strain gauge of the transducer member.

* * * * *

UNITED STATES PATENT AND TRADEMARK OFFICE
CERTIFICATE OF CORRECTION

PATENT NO. : 5,287,756
DATED : February 22, 1994
INVENTOR(S) : William P. Tassic It is certified that error appears in the above-indentified patent and that said Letters Patent is hereby corrected as shown below:

Column 6, line 2, before "42 of" replace "and" with --end--.

Column 8, line 55, (claim 13) after "compression strain" replace "gauge" with --gauges--.

Signed and Sealed this

Eleventh Day of October, 1994

Attest:

BRUCE LEHMAN

*Attesting Officer*  *Commissioner of Patents and Trademarks*